(12) United States Patent
V. M. et al.

(10) Patent No.: US 9,247,394 B2
(45) Date of Patent: Jan. 26, 2016

(54) USING NEIGHBORING ACCESS POINTS TO PROVIDE CLIENT DEVICE LOCATION DATA

(71) Applicant: Cisco Technology, Inc., San Jose, CA (US)

(72) Inventors: Mubeesh Ali V. M., Kerala (IN); Karthikeyan Balasubramanian, Karnataka (IN)

(73) Assignee: Cisco Technologies, Inc., San Jose, CA (US)

( * ) Notice: Subject to any disclaimer, the term of this patent is extended or adjusted under 35 U.S.C. 154(b) by 42 days.

(21) Appl. No.: 13/721,716

(22) Filed: Dec. 20, 2012

(65) Prior Publication Data

US 2014/0179352 A1    Jun. 26, 2014

(51) Int. Cl.
*H04W 24/00*   (2009.01)
*H04W 4/04*    (2009.01)
*H04W 64/00*   (2009.01)
*G01S 5/02*    (2010.01)
*H04W 12/12*   (2009.01)
*H04W 84/12*   (2009.01)
*H04W 88/08*   (2009.01)

(52) U.S. Cl.
CPC ............ *H04W 4/043* (2013.01); *G01S 5/0252* (2013.01); *H04W 64/00* (2013.01); *H04W 12/12* (2013.01); *H04W 84/12* (2013.01); *H04W 88/08* (2013.01)

(58) Field of Classification Search
CPC ........ H04W 64/00; H04W 4/02; H04W 48/04
USPC .............................. 455/456.1–456.6; 370/338
See application file for complete search history.

(56) References Cited

U.S. PATENT DOCUMENTS

| | | | |
|---|---|---|---|
| 6,009,091 A * | 12/1999 | Stewart et al. | 370/342 |
| 2006/0240840 A1* | 10/2006 | Morgan et al. | 455/456.1 |
| 2008/0112373 A1* | 5/2008 | Shpak | 370/338 |
| 2012/0093167 A1 | 4/2012 | Velandy et al. | |
| 2012/0105202 A1 | 5/2012 | Gits et al. | |
| 2012/0163331 A1 | 6/2012 | Chan et al. | |
| 2013/0281110 A1* | 10/2013 | Zelinka | 455/456.1 |

* cited by examiner

*Primary Examiner* — Vladimir Magloire
*Assistant Examiner* — Juan C Perez Tolentino
(74) *Attorney, Agent, or Firm* — Edell, Shapiro & Finnan, LLC (57) ABSTRACT

Techniques are presented to determine a location of a wireless client device operating in a wireless local area network. A beacon report request action frame is sent to a wireless client device, where the request frame is configured to cause the wireless client device to transmit a broadcast probe request frame. A beacon report response message is received from the wireless client device and includes one or more probe response frames transmitted by one or more wireless access points that receive the broadcast probe request frame. The wireless client device location is determined based in part on signal strength information in the probe response frames sent by the one or more wireless access points and which signal strength information indicates the signal strength observed by the one or more wireless access points with respect to the broadcast probe request frame transmitted by the wireless client device.

11 Claims, 6 Drawing Sheets

USING NEIGHBORING ACCESS POINTS TO PROVIDE CLIENT DEVICE LOCATION DATA

TECHNICAL FIELD

The present disclosure relates to determining a location of a wireless client device in a wireless local area network using information obtained from nearby access point devices.

BACKGROUND

The location of wireless client devices in a coverage area can be determined based on signal strength information between the wireless client devices and wireless access points (APs). An AP that is installed in a region will have its location previously known. This location information will be stored, for example, in mapping information associated with a particular region. When a wireless client device transmits data or frames, the same frame can be received by different APs in the vicinity at different signal levels. From these signal levels, it is possible to generate contours that represent approximate locations of wireless client devices at a particular instance. In one example, an intersection of the contours may represent an approximate location of a wireless client device. For location detection of wireless client devices, it may be necessary to have a minimum of three or more APs to determine these signal levels.

DESCRIPTION OF EXAMPLE EMBODIMENTS

Overview

Techniques are presented herein to determine a location of a wireless client device in a wireless local area network. A beacon report request action frame is sent to a wireless client device. The beacon report request action frame is configured to cause the wireless client device to transmit a broadcast probe request frame that is intended to be received by other access points in the neighborhood of the wireless client device. The wireless client device generates a beacon report response message that includes one or more probe response frames transmitted by one or more wireless access points that receive the broadcast probe request frame and which one or more probe response frames are received by the wireless client device. The wireless client device sends the beacon report response message, containing the one or more probe response frames, to the wireless access point that sent the beacon report request action frame, e.g., to its serving wireless access point. A location of the wireless client device is determined based at least in part on signal strength information contained in the one or more probe response frames sent by the one or more wireless access points and which signal strength information indicates the signal strength observed by the one or more wireless access points with respect to the broadcast probe request frame transmitted by the wireless client device.

Example Embodiments

Figure 1:
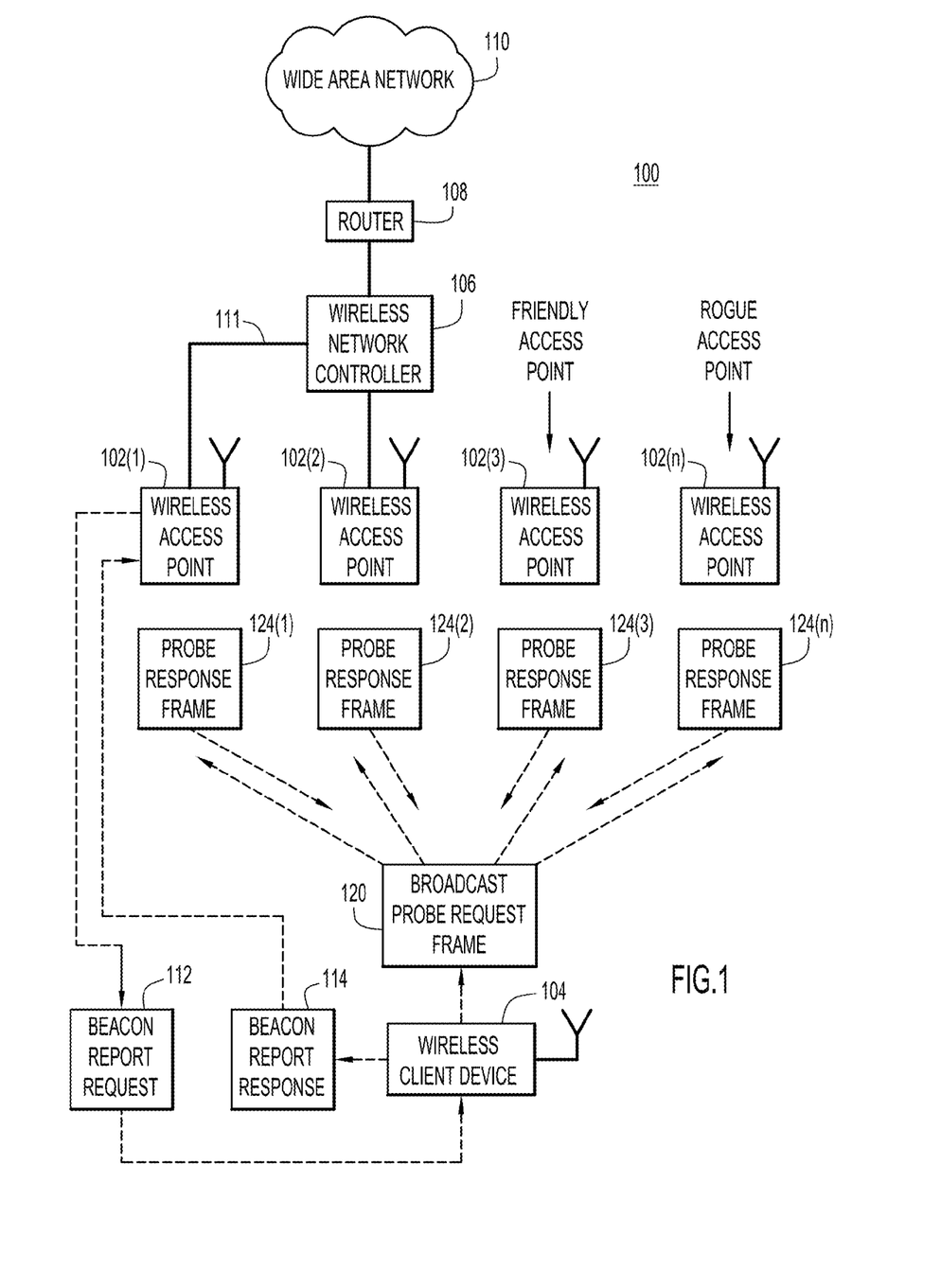
FIG. 1 shows an example of a wireless local area network in which the signaling techniques presented herein may be deployed.

The techniques presented herein relate to determining a location of a wireless client device in a wireless local area network (LAN). An example system topology 100 is illustrated in FIG. 1. The topology 100 (hereinafter "network topology," "wireless network" or "network") comprises a plurality of wireless access point devices ("wireless access points" or "wireless APs"). The wireless access points are shown at reference numerals 102(1)-102(n). There is a wireless client device ("client device") shown at reference numeral 104 that is associated with one of the APs 102(1)-102(n). Some of the APs are configured to communicate over a wired network connection with a wireless network controller device 106 ("wireless network controller" or "wireless controller") that controls the APs. The wireless network controller device 106 is, in turn, configured to communicate with a router device 108 ("router") which is connected to a wide area network (WAN) 110 and to a wired LAN 111.

The wireless network controller 106 is configured to retrieve traffic (e.g., audio, video and/or any type of data communications) from the WAN 110 (via the router 108) and is configured to deliver the traffic to the appropriate one of the wireless access points 102(1)-102 (n) via LAN 111. For example, in FIG. 1, wireless access point 102(1) and wireless access point 102(2) are in communication with, and under control of, the wireless network controller 106, and thus, the wireless network controller 106 is configured to deliver traffic from the WAN 110 to wireless access point 102(1) and wireless access point 102(2) for ultimate wireless transmission to a wireless client device, e.g., from wireless access point 102 (1) to the wireless client device 104. In other words, the wireless network controller 106 and the wireless access points in communication with the wireless network controller 106 (wireless access point 102(1) and 102(2) in FIG. 1) are part of a wireless LAN (WLAN). Wireless access point 102 (3) and wireless access point 102(n) are not controlled by the wireless network controller 106 in the example of FIG. 1, and thus, these other wireless access points are not part of the WLAN of access points 102(1) and 102(2). The locations of one or both of these wireless access points, however, may be known by the wireless access points in the WLAN. For example, the location of wireless access point 102(3) in the network 100 may be known by wireless access point 102(1), even though wireless access point 102(3) is not part of that same WLAN. Thus, wireless access point 102(3) may be referred to as a "known," "trustworthy" or "friendly" wireless access point, since its location in the network 100 is known to wireless access points (and other devices) in the WLAN. On the other hand, in one example, the location of wireless access point 102(n) in the network 100 may not be known by any of the wireless access points in the WLAN. Thus, wireless access point 102(n) may be referred to as an "unknown,"

"untrustworthy" or "rogue" wireless access point, since its location in the network 100 is not known to wireless access points (and other devices) in the WLAN.

Each of the wireless access points 102(1)-102(n) may be configured to wirelessly transmit traffic to the wireless client devices that they serve, according to the Institute of Electrical and Electronic Engineering (IEEE) 802.11 standard. While FIG. 1 shows a single wireless client device 104, it is to be understood that there are typically numerous wireless client devices in a WLAN deployment. It should also be appreciated that the topology in FIG. 1 is merely an example.

The wireless client device 104 may be a mobile device (e.g., mobile phone, computer, laptop, tablet, etc.). Furthermore, as shown in FIG. 1, the wireless client device 104 is configured to receive a beacon report request action frame or message, shown at reference numeral 112, from its serving wireless access point (e.g., wireless access point 102(1)) and is configured to send a beacon report response frame or message, shown at reference numeral 114, to wireless access point 102(1) in response to receiving the beacon report request action frame 112. As described herein, wireless access point 102(1) can evaluate information contained in the beacon report response message 114 to determine the location of the wireless client device 104.

Briefly, according to the techniques presented herein, the location of the wireless client device 104 can be determined based on received signal strength information (RSSI) obtained from transmissions made by the wireless client device 104 and received at numerous known locations using triangulation and other computations now known or hereinafter developed. The specific computations for determining the location of a client device are not material to the concepts described herein and are therefore not described in any detail.

Situations may arise in which signal strength information for transmissions by a client device is not available at a sufficient number of wireless access points that are part of a particular WLAN under the control of a wireless network controller. For example, when there is less than three wireless access points in the same WLAN that can receive transmissions from the wireless client device, there may not be sufficient information available to determine the location of the wireless client device.

The techniques described herein overcome these shortcomings by allowing a location of the wireless client device to be determined using signal strength information obtained for transmissions made by the wireless client device and received by any three or more wireless access points (e.g., friendly access points), regardless of whether all of the three or more wireless access points are in the same WLAN or not. That is, signal strength information is obtained from a transmission made by the wireless client device and received at one or more other nearby APs, some of which may not be part of the WLAN that the serving AP of the client device is part of. These "other" APs may be referred to as "non-network" APs in that they are not part of the WLAN of the client device's serving AP (i.e., they are not controlled by the wireless network controller that controls the client device's serving AP).

In particular, and by way of example, the location detection techniques described herein involve wireless access point 102(1) sending a beacon report request action frame 112 to the wireless client device 104, which causes the wireless client device 104 to transmit a broadcast probe request frame 120. The broadcast probe request frame 120 can be received by any wireless access point within range of the wireless client device 104, e.g., any one of the wireless access points 102(2)-102(n), including wireless access point 102(1). Each access point that receives the broadcast probe request frame 120 responds by sending a probe response frame to the wireless client device 104. For example, FIG. 1 shows the wireless access points 102(1)-102 (n) sending probe response frames to the wireless client device 104 in response to receiving the broadcast probe request frame 120 from the wireless client device 104. For example, access point 102(1) sends a probe response frame 124(1), access point 102(2) sends a probe response frame 124(2), access point 102(3) sends a probe response frame 124(3), and access point 102(n) sends a probe response frame 124(n). These probe response frames, in accordance with the IEEE 802.11 standard, include signal strength information representing the strength that an access point measured for the received broadcast probe request frame 120 that it received from client device 104. The wireless client device 104 then bundles all of the probe response frames together into the beacon report response message 114 that it sends to its serving wireless access point 102(1). Upon receiving the beacon report response message 114, wireless access point 102(1) can evaluate the probe messages, discard or filter out signal strength information from rogue/untrustworthy access points (e.g., access point 102(n) in FIG. 1) and determine the location of the wireless client device 104 based on information contained in each of the probe messages representing the signal strength between the wireless client device 104 and each of the remaining wireless access points 102(1)-102(n) that have not been filtered. Alternatively, the access point 102(1) can forward the signal strength information to some other computing device, e.g., the wireless network controller 106 or some other network management server, where the location computations are made.

Figure 2A:
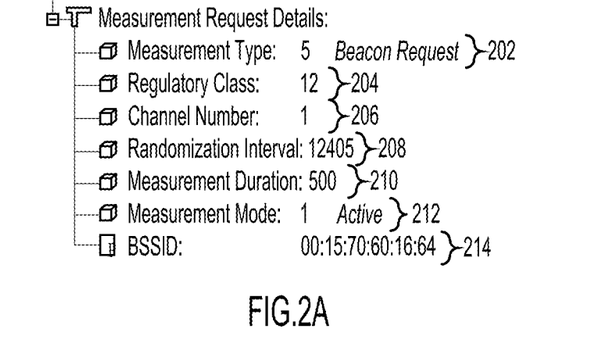
FIG. 2A shows an example of a beacon report request action frame sent from wireless access point devices to a client device in accordance with the techniques presented herein.
Figure 2B:
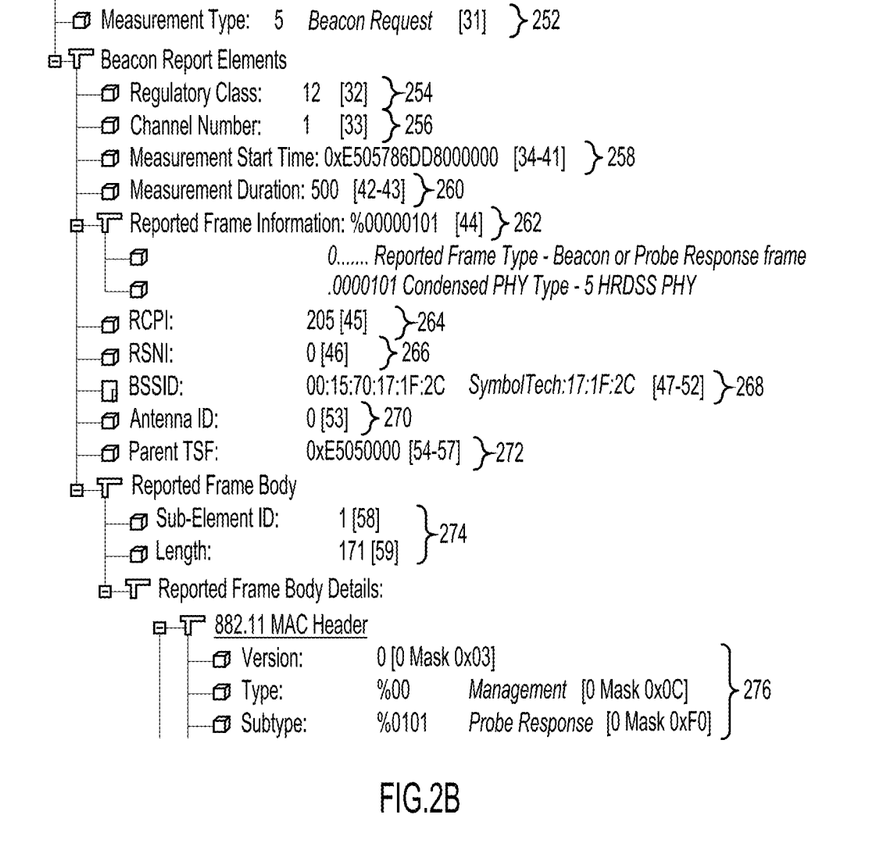
FIG. 2B shows an example of a beacon report response message sent from the client device to its serving wireless access point device in response to the beacon report request action frame.

Reference is now made to FIGS. 2A and 2B. FIG. 2A shows an example of the beacon report request action frame 112 sent from wireless access point 102(1) to the wireless client device 104. In one example, the beacon report request action frame 112 is an active beacon message. The beacon report request action frame 112 has several fields, including a measurement type field 202, a regulatory class field 204, a channel number field 206, a randomization interval field 208, a measurement duration field 210, a measurement mode field 212 and a Basic Service Set Identifier (BSSID) field 214. The measurement type field 202 identifies the message as a beacon report request action frame 112, and the measurement field 212 indicates that the message is in an active mode. In one example, when the beacon report request action frame 112 is sent in the active mode without any optional subelements, this is interpreted by the client device 104 that the entire probe response, e.g., probe response frames that the client device 104 receives, are to be bundled and sent in the beacon report response message 114.

Reference is now made to FIG. 2B. FIG. 2B shows an example of a beacon report response message 114 sent from the wireless client device 104 to wireless access point 102(1). The beacon report response message 114 has several fields, including: a measurement type field 252, regulator class field 254, channel number field 256, measurement start time field 258, measurement duration field 260, reported frame information field 262, Received Channel Power Indicator (RCPI) field 264, Received Signal Noise Indicator (RSNI) field 266, BSSID field 268, Antenna ID field 270, parent Timing Synchronization Function (TSF) field 272, frame body fields 274 and frame body detail fields 276. The beacon report response message 114 is sent by the wireless client device 104, and it is forwarded to the wireless network controller 106 by the wireless access point 102(1) (e.g., via or within a Control and Provisioning of Wireless Access Points (CAPWAP) encapsulation).

The beacon report response message 114, and in particular, the frame body fields 274 are populated with the one or more probe response frames received by the wireless client device 104 from any of the wireless access points that receive and respond to the broadcast probe request frame. Thus, the beacon report response message 114 bundles all of the probe response frames received by the client device 104 and this bundle of response frames is thereby sent to the wireless access point that initially sent the beacon report request 112 (e.g., wireless access point 102(1)) to the wireless client device 104. According to the IEEE 802.11 standard, each probe response frame contains information indicating the received signal strength, e.g., RSSI, measured by the access point that received the broadcast probe request frame and transmitted that probe response frame.

Again, the RSSI can be used to determine the location of the wireless client device 104. For example, as shown in Table 1, below, data is derived from the bundled probe response frames in the beacon report response frame 114 that is sent from the wireless client device 104 to the wireless access point 102(1). This information is used to derive RSSI values (e.g., a minimum of three RSSI values derived from the RCPI values) to determine the location of the wireless client device 104. As stated above, one or more of the probe response frames may also be filtered or discarded by the wireless access point 102(1) if the wireless access point 102(1) determines that the probe response frame is associated with a rogue/untrustworthy access point. Thus, the location of the wireless client device 104 is ultimately determined based on RSSI information derived from probe response frames associated either with wireless access points in the WLAN or friendly wireless access points.

TABLE 1

| BSSID | RCPI | RNPI | Channel Number | Derived RSSI |
|---|---|---|---|---|
| B1 | RC1 | RN1 | C1 | DR1 |
| B2 | RC2 | RN2 | C2 | DR2 |
| B3 | RC3 | RN3 | C3 | DR3 |

Figure 3A:
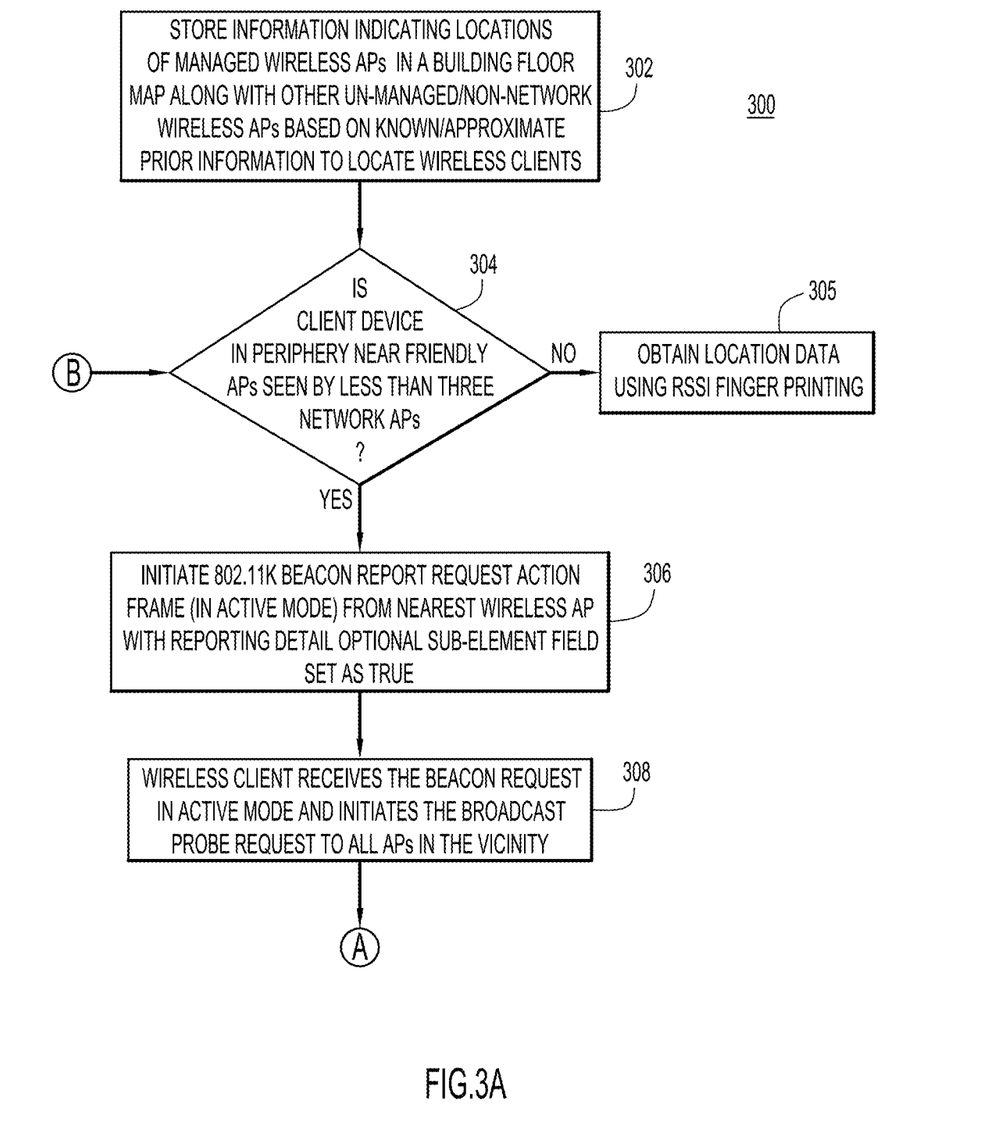
FIGS. 3A and 3B show an example flow chart depicting operations of the wireless access point device sending the beacon report request action frame to the client device and the client device sending the beacon report response message to the wireless access point device.
Figure 3B:
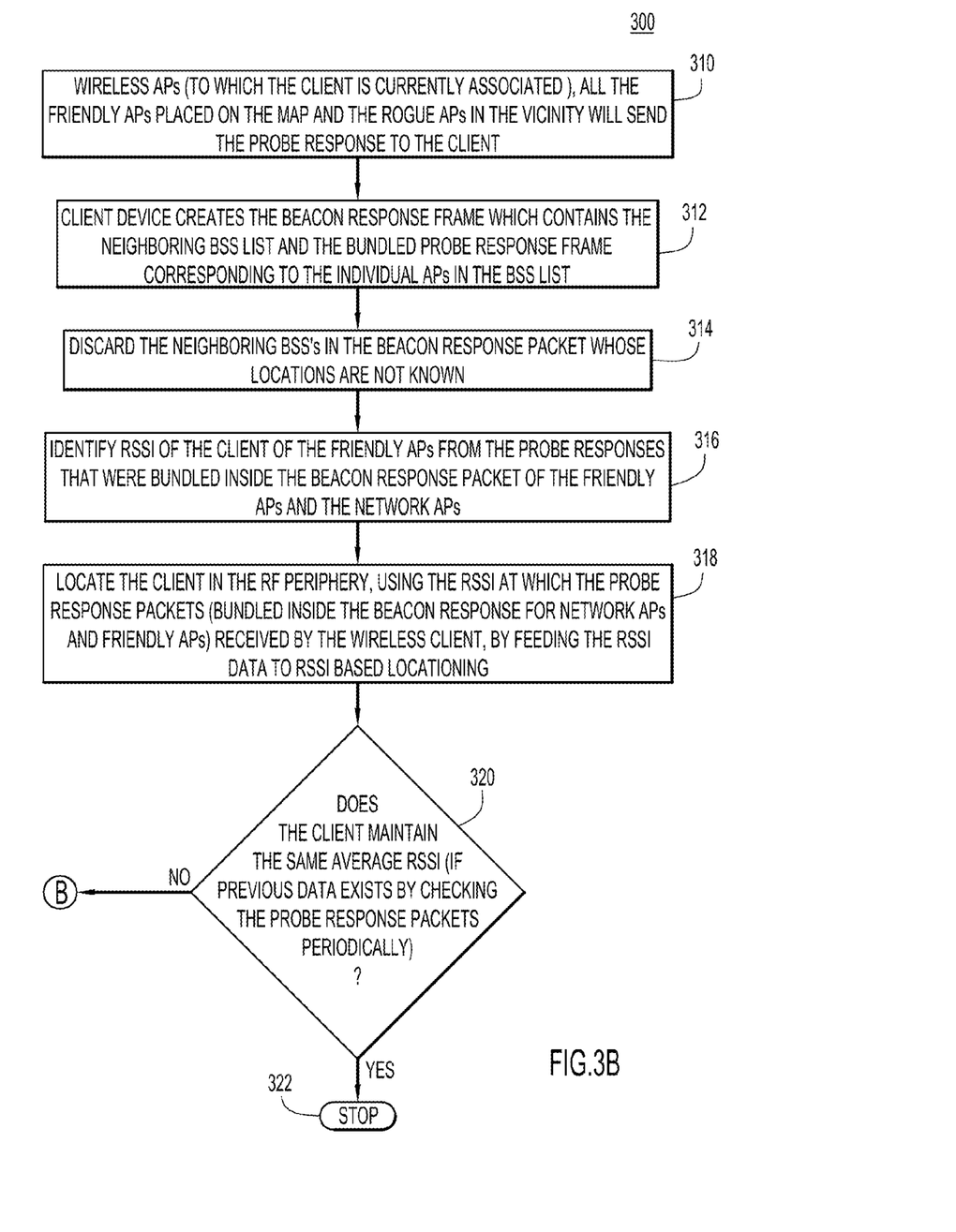

Reference is now made to FIGS. 3A and 3B. FIGS. 3A and 3B show an example flow chart 300 depicting operations of determining a location of a wireless client device 104 in connection with the techniques presented herein. As stated above, it should be appreciated that the location determination of the wireless client device 104 may be performed by the wireless network controller 106 or one of the wireless access points in the WLAN (e.g., wireless access point 102(1)) or any computing device that can gain access to the information needed for the location computations. In FIG. 3A, at operation 302, the wireless access point 102(1) stores information indicating locations of managed wireless access points (e.g., wireless access points in a WLAN). For example, the locations of wireless access points 102(1) and 102(2) in the WLAN may be stored in a building floor map along with other un-managed/non-network wireless access points that are not in the WLAN, but whose prior known or approximate location is made known or available to the wireless access point 102(1). In operation 302, location information about friendly or known access points not part of the WLAN are stored (e.g., access point 102(3) in FIG. 1) and location information about rogue access points not part of the WLAN (e.g., access point 102(n) in FIG. 1) are not stored. That is, access point 102(3) is classified as a friendly access point because its location information is stored by access point 102(1), and access point 102(n) is classified as a rogue or untrustworthy access point because its location information is not stored.

At operation 304, a determination is made as to whether the wireless client device 104 is in the vicinity/periphery (e.g., in wireless communication range) with less than three access points in the WLAN. For example, in FIG. 1, wireless client device 104 is in proximity of only two wireless access points that are part of the same WLAN (access point 102(1) and 102(2)). If the wireless client device 104 is in communication with three or more access points, the wireless access point 102(1), at operation 305, uses these access points to determine a location of the wireless client device 104. If the wireless client device 104 is in communication with less than three access points (e.g., in FIG. 1), then, at operation 306, the wireless access point 102(1) initiates a beacon report request action frame 112 (in an active mode), e.g., in accordance with IEEE 802.11k. It should be appreciated that the initiation in operation 306 may also be made by the wireless network controller 106 to instruct one of the wireless access points in the WLAN to send the beacon report request action frame 112. At operation 308, the wireless client device 104 receives the beacon report request action frame 112 and initiates a broadcast probe request frame 120 to all of the wireless access points in the vicinity of the wireless client device 104.

Reference is now made to FIG. 3B which shows a continuation of flow chart 300 from FIG. 3A. In response to receiving the broadcast probe request frame 120, at operation 310, the wireless access point 102(1) and all other access points 102 (2)-102(n) (friendly and unfriendly access points) send a probe response message to the wireless client device 104. After receiving these probe response messages, at operation 312, the wireless client device 104 creates a beacon report response message 112 which contains a neighboring Basic Service Set (BSS) list and also the bundled probe response frames corresponding to (and sent by) individual access points in the BSS list. The beacon report response message 112 (with the bundled probe response frames) is sent to the wireless access point that initiated the beacon report request frame 112 (e.g., wireless access point 102(1)), and at operation 314, upon receiving the beacon report response message 120, the wireless access point 102(1) discards probe response messages for access points in the BSS list that are not known. This will filter out rogue access points and other access points in other BSSs which may not be useful in determining the location of the wireless client device 104.

At operation 316, wireless access point 102(1) identifies the RSSI of the wireless client device 104 by evaluating the probe response frames of remaining access points in the BSS list (that were bundled inside the beacon response frame). At operation 318, the wireless AP determines the location of the wireless client device 104 based on the RSSI values (e.g., three or more RSSI values associated with access points in the WLAN or friendly access points at known locations). As stated above, it should be appreciated that this location determination may be performed by the wireless network controller 106 and may use any RSSI based location computation now known or hereinafter developed. At operation 320 a determination is made as to whether the wireless client device maintains an average expected RSSI value. The probe response packets from the client device 104 may be checked periodically for the determination in operation 320. If an average expected RSSI value is maintained, the location determination operation terminates at operation 322. If not, the process reverts to operation 304 to restart the location determination process.

Figure 4:
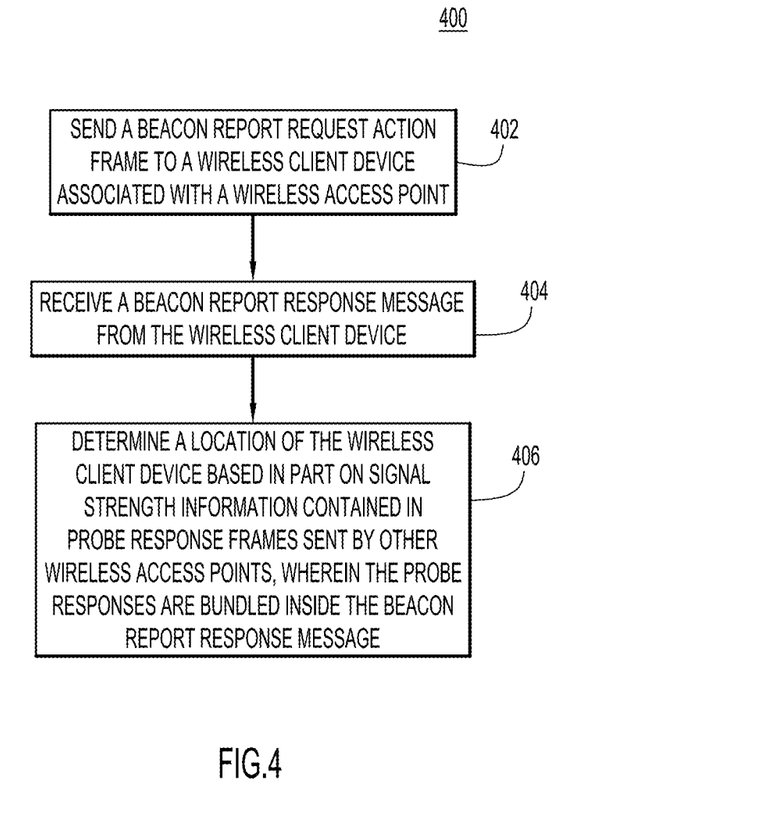
FIG. 4 shows an example flow chart depicting operations of the wireless access point device for determining the location of the client device in accordance with the techniques presented herein.

Reference is now made to FIG. 4. FIG. 4 shows an example flow chart 400 depicting operations associated with wireless access point 102(1) or wireless network controller 106. At operation 402, a beacon report request action frame is sent to a wireless client device. The beacon report request action frame is configured to cause the wireless client device 104 to transmit a broadcast probe request frame. At operation 404, a beacon report response message is received from the wireless client device 104. The beacon report response message includes a bundle of one or more probe response frames transmitted by one or more (e.g., other) wireless access points (including the client device's serving access point, e.g. access point 102(1)) that receive the broadcast probe request frame and which one or more probe response frames are received by the wireless client device from the one or more wireless access points that received the broadcast probe request frame. At operation 406, a location of the wireless client device 104 is determined based at least in part on signal strength information contained in the one or more probe response frames sent by the one or more wireless access points that receive the broadcast probe request frame. As stated above, the probe response frames are bundled inside the beacon report response message. The signal strength information indicates the signal strength observed by the one or more wireless access points with respect to the broadcast probe request frame transmitted by the wireless client device 104. It should be understood that the location computation made at operation 406 may also be based further on RSSI associated with signals received at the serving access point (for the wireless client device) from the wireless client device (whose location is to be determined), as well as one or more other wireless access points that are part of the same WLAN as the serving access point for the wireless client device. Again, the signal strength information obtained by the non-network access points is particularly useful when there is an insufficient number of access points in the WLAN (of which the client device's serving access point is part) that can receive signals from the wireless client device whose location is to be determined.

Figure 5:
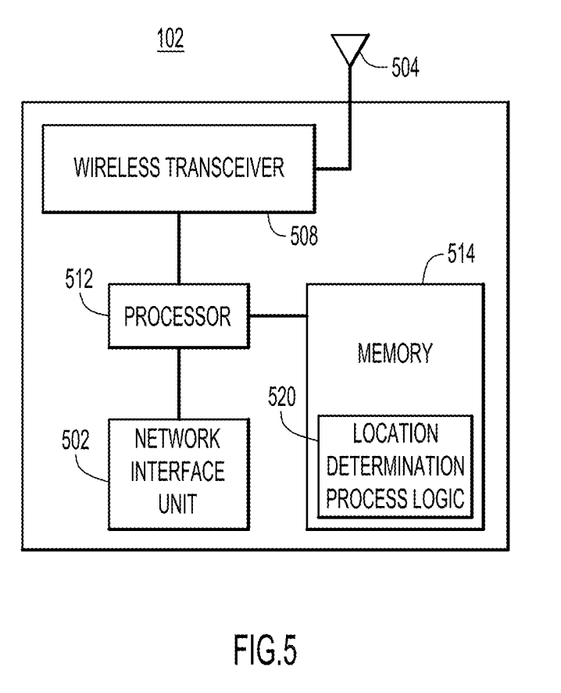
FIG. 5 shows an example block diagram of a wireless access point device configured to obtain signal strength information useful in determining the location of a client device in accordance with the techniques presented herein.

Reference is now made to FIG. 5. FIG. 5 shows an example block diagram of any one of the wireless access points 102(1)-102(n). For simplicity, the wireless access point in FIG. 5 is generically identified by reference numeral 102. The wireless access point device 102 comprises, among other components, a wired network interface unit 502, an antenna 504, a wireless transceiver 508, a processor 512 and a memory 514. The wireless transceiver 508 sends and receives wireless signals via the antenna 504. In one example, the wireless transceiver 508 may be an IEEE 802.11 chipset. The network interface unit 502 enables wired network communication, e.g., with the wireless network controller 106. The processor 512 may be a microprocessor or microcontroller. In one example, the processor 512 is configured to execute location determination process logic 520, stored in memory 514, to perform the operations described herein in connection with FIGS. 1-4 and to determine the location of a wireless client device or to obtain information useful to determine the location of a wireless client device. The functions of the processor 512 may be implemented by logic encoded in one or more tangible computer readable storage media or devices (e.g., storage devices, compact discs, digital video discs, flash memory drives, etc. and embedded logic such as an application specific integrated circuit, digital signal processor instructions, software that is executed by a processor, etc.).

The memory 514 may comprise read only memory (ROM), random access memory (RAM), magnetic disk storage media devices, optical storage media devices, flash memory devices, electrical, optical, or other physical/tangible (non-transitory) memory storage devices. Thus, in general, the memory 514 may comprise one or more computer readable storage media (e.g., a memory storage device) encoded with software comprising computer executable instructions and when the software is executed (e.g., by the processor 512) it is operable to perform the operations described for the location determination process logic 520.

The process logic 520 may take any of a variety of forms, so as to be encoded in one or more tangible computer readable memory media or storage devices for execution, such as fixed logic or programmable logic (e.g., software/computer instructions executed by a processor), and the processor 512 may be an application specific integrated circuit (ASIC) that comprises fixed digital logic, or a combination thereof.

For example, the processor 512 may be embodied by digital logic gates in a fixed or programmable digital logic integrated circuit, which digital logic gates are configured to perform the operations of the process logic 520. In general, the process logic 520 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the wireless access point 102(1) or wireless network controller 106 may be performed by one or more computer or machine readable storage media (non-transitory) or device executed by a processor and comprising software, hardware or a combination of software and hardware to perform the operations described herein.

To the extent any operations can be performed by a wireless network controller, e.g., wireless network controller 106, it should be understood that such an apparatus comprises one or more processors, memory to store software instructions that are executed by the processor(s) to perform operations described herein, and a network interface unit to route packets over a wired network between the access points under control of the wireless network controller 106 and wide area network, e.g., the Internet.

In summary, a method is provided comprising: at a wireless access point in a wireless local area network, sending a beacon report request action frame to a wireless client device associated with the wireless access point, the beacon report request action frame configured to cause the wireless client device to transmit a broadcast probe request frame; receiving a beacon report response message from the wireless client device, wherein the beacon report response message includes one or more probe response frames transmitted by one or more wireless access points that receive the broadcast probe request frame and which probe response frames are received by the wireless client device from the wireless access points; and determining a location of the wireless client device based at least in part on signal strength information contained in the one or more probe response frames sent by the one or more wireless access points and which signal strength information indicates the signal strength observed by the one or more wireless access points with respect to the broadcast probe request frame transmitted by the wireless client device.

In addition, an apparatus is provided comprising: a network interface unit configured to enable communications over a network; a memory; and a processor coupled to the network interface unit and the memory and configured to: send a beacon report request action frame to a wireless client device, the beacon report request action frame configured to cause the wireless client device to transmit a broadcast probe request frame; receive a beacon report response message from the wireless client device, wherein the beacon report response message includes one or more probe response frames transmitted by one or more wireless access points that receive the broadcast probe request frame and which one or more probe response frames are received by the wireless client device from the one or more wireless access points; and determine a location of the wireless client device based at least in part on signal strength information contained in the one or more probe response frames sent by the one or more wireless access points and which signal strength information indicates the signal strength observed by the one or more wireless access points with respect to the broadcast probe request frame transmitted by the wireless client device.

Furthermore, one or more computer readable storage media encoded with software is provided comprising computer executable instructions and when the software is executed operable to: generate a beacon report request action frame to be sent to a wireless client device, the beacon report request action frame configured to cause the wireless client device to transmit a broadcast probe request frame; receive a beacon report response message from the wireless client device, wherein the beacon report response message includes one or more probe response frames transmitted by one or more wireless access points that receive the broadcast probe request frame and which probe response frames are received by the wireless client device from one or more wireless access points; and determine a location of the wireless client device based at least in part on signal strength information contained in the one or more probe response frames sent by the one or more wireless access points and which signal strength information indicates the signal strength observed by the one or more wireless access points with respect to the broadcast probe request frame transmitted by the wireless client device.

It should be understood that while the techniques presented herein are described as being applicable to determining a location of a wireless client device, they be used for other (non-location related) purposes, such as surveys of coverage areas in a wireless network, etc.

The above description is intended by way of example only. Various modifications and structural changes may be made therein without departing from the scope of the concepts described herein and within the scope and range of equivalents of the claims.

What is claimed is:

1. A method comprising:
providing access to a wireless local area network for a wireless client device using one of a plurality of wireless access points;
storing information indicating locations of at least one of the plurality of wireless access points;
sending a beacon report request action frame from a first access point among the plurality of access points to the wireless client device, the beacon report request action frame including a measurement type field and a measurement mode field, wherein the beacon report request action frame is configured to cause the wireless client device to transmit a broadcast probe request frame according to an IEEE 802.11 standard;
receiving at the first access point, from the wireless client device, a beacon report response message configured according to the measurement mode field, wherein the beacon report response message includes one or more probe response frames transmitted according to the IEEE 802.11 standard by one or more wireless access points that receive the broadcast probe request frame and which probe response frames are received by the wireless client device from the one or more wireless access points; and
evaluating the one or more probe response frames contained in the beacon report response message received from the wireless client device;
discarding signal strength information associated with a wireless access point for which no location information is stored; and
determining a location of the wireless client device based at least in part on signal strength information contained in the probe response frames sent by the one or more wireless access points and which signal strength information indicates the signal strength observed by the one or more wireless access points with respect to the broadcast probe request frame transmitted by the wireless client device.

2. The method of claim 1, wherein sending comprises sending the beacon report request action frame without any optional sub-elements such that upon receiving the beacon report request action frame, the wireless client device is configured to include in the beacon response report message the probe response frames that the wireless client device receives from the one or more wireless access points.

3. The method of claim 1, wherein determining comprises determining the location of the wireless client device based further on received signal strength information determined at the first access point from signals transmitted by the wireless client device to the first access point.

4. The method of claim 3, wherein the one or more wireless access points are not part of the wireless local area network.

5. An apparatus comprising:
a network interface unit configured to provide access to a wireless local area network for a wireless client device;
a memory; and
a processor coupled to the network interface unit and the memory and configured to:
send a beacon report request action frame to the wireless client device, the beacon report request action frame including a measurement type field and a measurement mode field, wherein the beacon report request action frame is configured to cause the wireless client device to transmit a broadcast probe request frame to a plurality of wireless access points according to an IEEE 802.11 standard;
store information indicating locations of at least one of the plurality of wireless access points;
receive a beacon report response message configured according to the measurement mode field from the wireless client device, wherein the beacon report response message includes one or more probe response frames transmitted according to the IEEE 802.11 standard by one or more wireless access points that receive the broadcast probe request frame and which probe response frames are received by the wireless client device from the one or more wireless access points; and
evaluate the one or more probe response frames contained in the beacon report response message received from the wireless client device;
discard signal strength information received from a wireless access point for which no location information is stored; and
determine a location of the wireless client device based at least in part on signal strength information contained in the one or more probe response frames sent by the one or more wireless access points and which signal strength information indicates the signal strength observed by the one or more wireless access points with respect to the broadcast probe request frame transmitted by the wireless client device.

6. The apparatus of claim 5, wherein the processor is further configured to send the beacon report request action frame without any optional sub-elements such that upon receiving the beacon report request action frame, the wireless client device is configured to include the probe response frames that the wireless client device receives from the one or more wireless access points.

7. The apparatus of claim 5, wherein the processor is further configured to determine the location of the wireless client device based further on received signal strength information from signals transmitted by the wireless client device and received at the apparatus.

8. The apparatus of claim 7, wherein the processor is further configured to determine the location of the wireless client device based on received signal strength information determined at the one or more wireless access points that are not part of the wireless local area network.

9. A non-transitory computer-readable storage media encoded with software comprising computer executable instructions and when the software is executed operable to cause a processor to:

provide access to a wireless local area network for a wireless client device;

generate a beacon report request action frame to be sent to the wireless client device, the beacon report request action frame including a measurement type field and a measurement mode field, wherein the beacon report request action frame is configured to cause the wireless client device to transmit a broadcast probe request frame to a plurality of wireless access points according to an IEEE 802.11 standard;

store information indicating locations of at least one of the plurality of wireless access points;

receive a beacon report response message configured according to the measurement mode field from the wireless client device, wherein the beacon report response message includes one or more probe response frames transmitted according to the IEEE 802.11 standard by one or more wireless access points that receive the broadcast probe request frame and which probe response frames are received by the wireless client device from the one or more wireless access points; and evaluate the probe response frames contained in the beacon report response message received from the wireless client device;

discard signal strength information associated with a wireless access point for which no location information is stored; and determine a location of the wireless client device based at least in part on signal strength information contained in the one or more probe response frames sent by the one or more wireless access points and which signal strength information indicates the signal strength observed by the one or more wireless access points with respect to the broadcast probe request frame transmitted by the wireless client device.

10. The computer-readable storage media of claim 9, wherein the instructions operable to cause the processor to send comprise instructions operable to cause the processor to send the beacon report request action frame without any optional sub-elements such that upon receiving the beacon report request action frame, the wireless client device is configured to include the probe response frames that the wireless client device receives from the one or more wireless access points.

11. The computer-readable storage media of claim 9, wherein the instructions operable to cause the processor to determine the location of the wireless client device comprise instructions operable to cause the processor to determine the location of the wireless client device based further on received signal strength information for signals transmitted by the wireless client device.

* * * * *

UNITED STATES PATENT AND TRADEMARK OFFICE
CERTIFICATE OF CORRECTION

PATENT NO. : 9,247,394 B2  
APPLICATION NO. : 13/721716  
DATED : January 26, 2016  
INVENTOR(S) : V. M. et al.

Page 1 of 1

It is certified that error appears in the above-identified patent and that said Letters Patent is hereby corrected as shown below:

On the Title page

Item (73) Assignee:, replace "Cisco Technologies, Inc." with -- Cisco Technology, Inc. --

In the Claims

Column 10, Claim 1, Line 4, remove "and"

Column 10, Claim 5, Line 57, remove "and"

Column 12, Claim 9, Line 6, remove "and"

Signed and Sealed this  
Tenth Day of May, 2016

Michelle K. Lee  
*Director of the United States Patent and Trademark Office*